US006454554B1

(12) United States Patent
Lopez et al.

(10) Patent No.: US 6,454,554 B1
(45) Date of Patent: Sep. 24, 2002

(54) MOLDING ELEMENT AND MOLD FOR MOLDING A CUTOUT IN A TREAD

(75) Inventors: José Merino Lopez, Riom; Georges Lavialle, Billom; Pascal Auxerre, Royat; Pascal Falempin, Issoire, all of (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 09/567,290

(22) Filed: May 8, 2000

(30) Foreign Application Priority Data

May 6, 1999 (FR) .............................. 99 05820

(51) Int. Cl.⁷ .............................. B29D 30/68
(52) U.S. Cl. ................ 425/28.1; 425/46; 425/438; 425/DIG. 58
(58) Field of Search ............... 425/28.1, 35, 46, 425/438, DIG. 58; 152/DIG. 3

(56) References Cited

U.S. PATENT DOCUMENTS

| 3,642,416 | A | | 2/1972 | Miller | |
|---|---|---|---|---|---|
| 6,143,223 | A | * | 11/2000 | Lopez | 425/46 |
| 6,193,492 | B1 | * | 2/2001 | Lagnier et al. | 425/46 |
| 6,200,118 | B1 | * | 3/2001 | Lopez et al. | 425/46 |
| 6,318,983 | B1 | * | 11/2001 | Lopez et al. | 425/46 |
| 6,318,984 | B1 | * | 11/2001 | Lopez | 425/46 |

FOREIGN PATENT DOCUMENTS

| EP | 0873851 | 10/1998 |
|---|---|---|
| EP | 0925907 | 6/1999 |
| FR | 1406950 | 11/1965 |
| FR | 2759321 | 8/1998 |
| FR | 2759323 | 8/1998 |
| JP | 1024709 | 1/1989 |

OTHER PUBLICATIONS

Patent Abstracts of Japan, JP 11000924, Matsushita Electric Ind. Co. Ltd., Jan. 6, 1999, Abstract.

* cited by examiner

Primary Examiner—James P. Mackey
(74) Attorney, Agent, or Firm—Baker Botts L.L.P.

(57) ABSTRACT

A molding element has an anchoring portion and a molding portion, the anchoring portion being intended to be anchored in a part of a tire tread mold with the molding portion projecting from a molding face of the tire tread mold part. The molding portion of the molding element has at least two extensions, one of these extensions having at least one arm pivotally mounted on the extension. The molding element is characterized in that, in the molding position, at least one arm pivotally mounted on an extension bears on another extension of the same molding element to define at least one orifice passing through the molding element to mold a connecting bridge between opposite walls of a cutout molded by the molding element.

8 Claims, 5 Drawing Sheets

MOLDING ELEMENT AND MOLD FOR MOLDING A CUTOUT IN A TREAD

BACKGROUND OF INVENTION

The invention relates to a molding element for molding a cutout in a tread of a tire, and to a mold equipped with at least one such molding element.

Patent FR 2 759 323 describes a novel tread pattern for a tire tread which is particularly advantageous as far as the traveling noise and wear performance is concerned. In this application, there is proposed a tread pattern for a tire comprising a plurality of cutouts, the walls of which are connected by at least one connecting bridge; there is also proposed a production method according to which an insert, for example made of paper, provided with at least one orifice allowing the rubber mix to pass during molding in order to produce a connecting bridge, is introduced into a tread before molding and vulcanization.

In another patent FR 2 759 321, another process is proposed for producing such a tread pattern, using a mold comprising an upper part and a lower part, each of said parts being provided with molding elements which cooperate to mold cutouts provided with connecting bridges. This method, although very advantageous, however, requires, first of all, a tread to be manufactured and then, secondly, said tread to be assembled on a tire blank devoid of a tread.

SUMMARY OF THE INVENTION

One object of the present invention is to produce a tread comprising at least one cutout provided with at least one connecting bridge by molding the tread directly during the molding and vulcanization of a tire provided with this tread without having to introduce an inserted material into a tread.

To achieve this object, there is proposed a molding element intended to be fitted on a mold for molding a cutout in a tread of rubber mix, said cutout having its main walls connected by at least one connecting bridge of rubber mix. Each mold part has a molding face for molding the running surface of said tread, and can be moved in a direction of molding/demolding.

The molding element according to the invention comprises an anchoring part intended to be fastened to a mold part and prolonged by a molding part intended to project from the molding face of said part. The molding part of the molding element according to the invention comprises at least two extensions forming prolongations and the faces of which are intended to mold walls defining the cutout, at least one of these extensions comprising at least one arm which is mounted to pivot about a pivot pin fastened to said extension.

"Cutout" is understood to mean, in the field of tires for passenger vehicles or heavy vehicles, either a groove, characterized by a width at least equal to 3 mm, or an incision, characterized by a width of less than 3 mm.

In the molding configuration, an arm which is mobile in rotation is said to bear on another extension of the same molding element when part of one of its wall faces is in contact with said other extension. Within the scope of the invention, it may be envisaged that a mobile arm mounted on a extension is in contact with a mobile arm of another extension of the same molding element.

At the start of the demolding operation, after molding and vulcanization of a tread with a mold fitted with a molding element according to the invention, each arm which is mobile in rotation is subjected to the stresses exerted by the connecting bridges molded in the orifices and will then turn to permit extraction of the molding element from the tread without breaking the molded connecting bridges. Of course, this demolding is only possible owing to the mechanical properties of the rubber mixes (in particular, the possibility of great deformation without there being any breaking of said mixes).

Advantageously, elastic return means may be provided to force each arm which is mobile in rotation to resume the position which it occupies in the molding position, so as to ensure good molding geometry. With the same aim, alone or in combination with the previous arrangement, means for retaining said mobile arms in the molding position may be provided, these means being effective up to a predetermined level of stress (which is of course less than the stresses exerted by the mix during demolding in order to permit demolding).

The invention also relates to a part of a mold for a tire tread. This part is provided with a molding face for molding the running surface of the tread, and may be displaced in a direction of molding/demolding. This mold part comprises at least two elements in relief projecting from the molding face of said part, at least one of said elements in relief comprising a to support bearing at least one arm mounted to pivot about a pivot pin attached to said support.

The mold part is characterized in that, in the molding configuration, at least one arm mounted to pivot on an element in relief bears on another element in relief to form at least one orifice intended for rubber mix to pass through during the molding of a tread.

"Bearing of a pivoting arm on an element in relief" is understood to mean that this arm, in the molding configuration, has a face which is in contact at least in part with at least one face of said element in relief.

The mold part according to the invention makes it possible, in particular, to mold in a tread a cutout, the main walls of which are connected by one or more connecting bridges, at least one of said bridges being located entirely beneath the running surface of the molded tread (for this, at least one mobile arm is at a distance strictly greater than zero from the molding face of the mold part).

After molding and vulcanization of a tread and at the time of demolding (that is to say, extraction of the elements in relief from the tread), the arms, which are mounted to pivot in a plane containing the direction of molding/demolding, will pivot under the action of the forces exerted by the rubber mix passing through the orifices of the element in relief. Once the mobile arms have pivoted, it is then possible to disengage the elements in relief from the tread without any breaking of the bridges.

Preferably, elastic return means may be provided to force the pivoting arms to resume the position which they occupy in the molding position. Furthermore, means for retaining said mobile arms in the molding position may be added, these means being effective up to a predetermined level of stress (which is of course less than the stresses exerted by the mix during demolding).

The invention which has been set forth above will be better understood with reference to the following description, given with respect to the drawings, which show several variants according to the invention which are shown in non-limitative manner:

DESCRIPTION OF PREFERRED EMBODIMENTS

Figure 1:
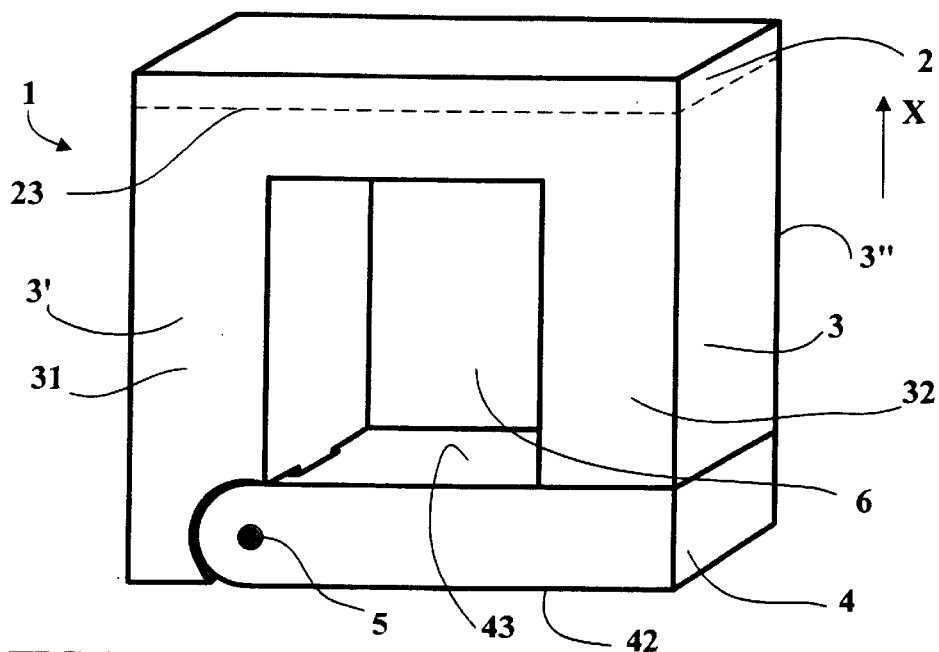
FIG. 1 shows a first variant of a molding element according to the invention in the molding configuration.

In FIG. 1, a molding element 1 is shown in the molding configuration for molding an incision having a connecting bridge connecting the main walls of said incision. This molding element 1 has substantially the form of a blade comprising an orifice 6 for molding an incision comprising a connecting bridge molded in said orifice 6. This molding element 1 is formed of an anchoring portion or part 2, intended to be fastened to a mold part, and extended by a molding portion or part 3 which projects from the molding face of said part (the limit between the anchoring part and the molding part is indicated diagrammatically by the broken line 23). The molding part 3 has two main molding faces 3' and 3" (only the front face 3' is visible in this figure), said faces being substantially parallel and spaced apart by a small distance compared with the other dimensions of said molding part. This molding part 3 comprises two extensions 31 and 32 which are rectangular in shape and are of unequal length.

Furthermore, a pivoting arm 4, of the same thickness as the thickness of the extensions 31 and 32 and comprising an inner molding face 43 and an outer molding face 42, is mounted to rotate freely about a pivot pin 5 passing perpendicularly through the extension 31 from one face 3' to the other face 3". In the molding configuration shown in FIG. 1, the end part of the inner face 43 of this pivoting arm is in contact with the end wall of the other extension 32.

Figure 2:
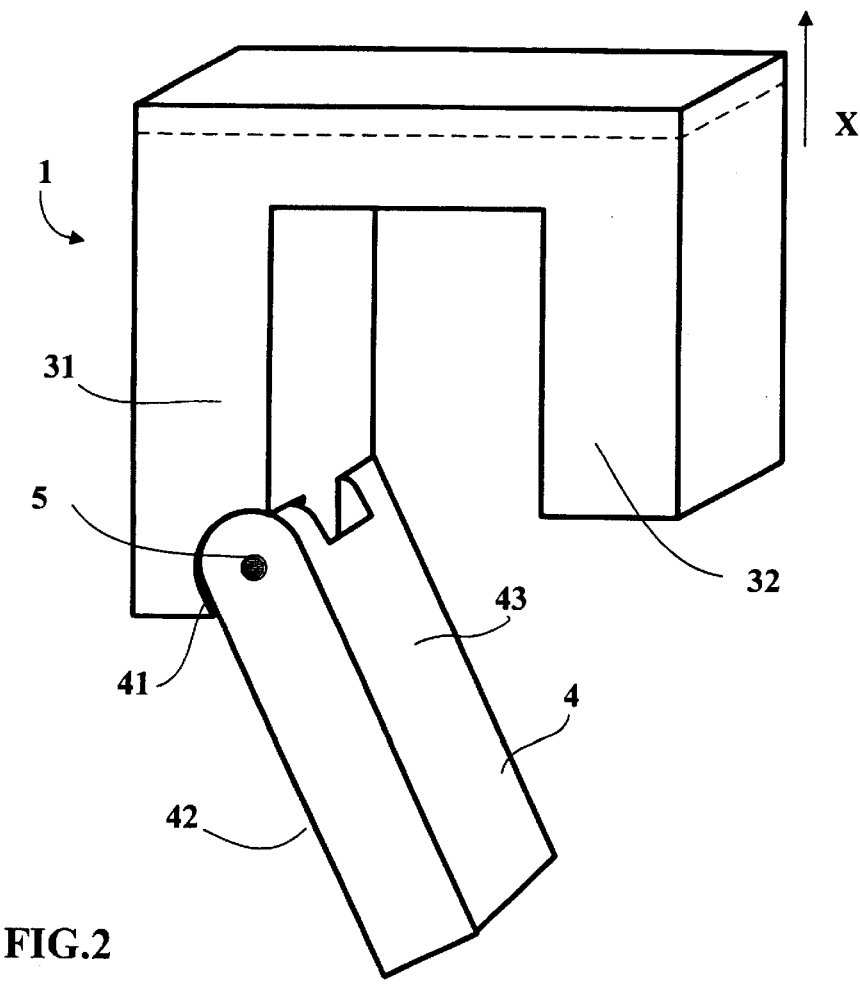
FIG. 2 shows the molding element of FIG. 1 in the position after demolding.

During the demolding phase, the molding element 1 is driven by the mold part on which it is mounted, in a direction marked by the arrow X in FIG. 1. During this phase, the connecting bridge molded in the orifice 6 opposes the extraction of the molding element from the molded tread and exerts a force on the arm which, owing to its mounting in rotation, will turn about the pivot pin 5, thus creating a passage for the arm to disengage from the bridge. FIG. 2 shows this same molding element 1 in the final phase of demolding, the pivoting arm being in the open position to permit the extraction of the molding element from the molded tread.

Advantageously, means are provided on the extension 31 bearing the pivoting arm 4 to limit the maximum rotation of the arm 4 so that the passage created for demolding has sufficient dimensions for there not to be any breaking of the connecting bridge, while making it possible, under the forces exerted by the rubber mix of a new tread to be molded, for the pivoting arm to resume the molding position in contact with the extension 32. These means consist, in the present case, of a bearing surface 41 which is oblique relative to the direction X against which the outer face 42 of the mobile arm 4 will butt.

To improve still further the return into the molding position, provision may be made to associate elastic return means with the molding element according to the invention, such as, for example, a spring fastened to or in the extension 31 and acting on the pivoting arm to force it to come back into contact with the other extension 32 after demolding.

Another advantageous variant consists in providing the arm 4 with a prolongation extending beyond the extension 32 in the molding configuration, such that the lever effect is increased to facilitate the rotational movement of said arm during the operation of penetration into the non-vulcanized rubber mix at the moment of closure of the mold equipped with the molding element according to the invention.

Furthermore, and so as to be sure that the pivoting arm is and remains in the proper molding position before any new molding of a tread, it is advantageous to provide means for retaining said arm in the molding position, these means being effective up to a predetermined level of stress (which is of course less than the level of the stresses exerted by the mix during demolding).

Figure 3:
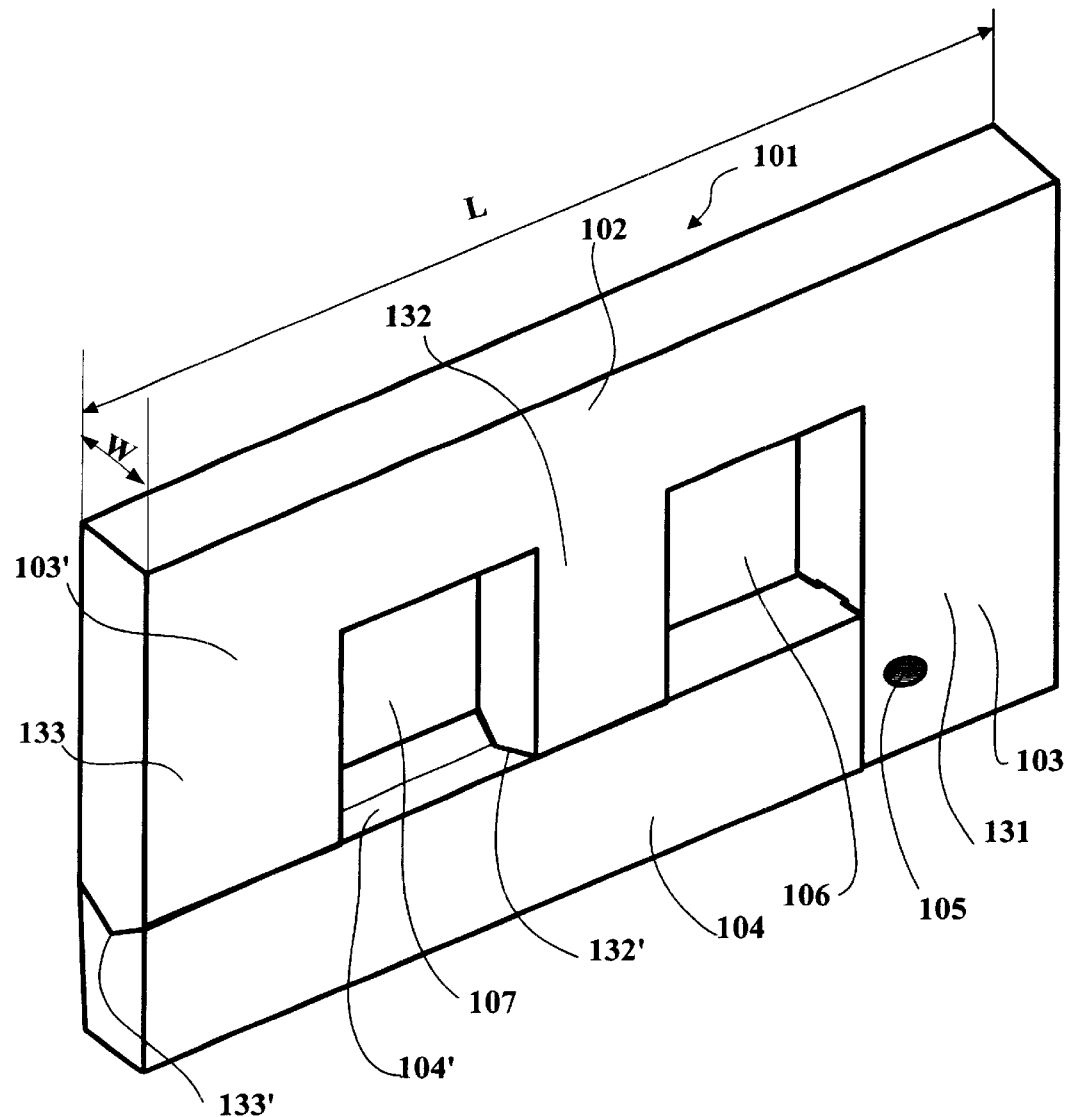
FIG. 3 shows another variant of a molding element according to the invention having two orifices for molding two connecting bridges.

The molding element 101 illustrated in FIG. 3 is intended to mold a cutout of thickness W, the main walls of which are planar and are connected mechanically by two connecting bridges molded in the orifices marked 106 and 107. In the perspective view shown in this FIG. 3, only the front face 103' molding one of the main walls of a cutout is visible. As in the variant shown in FIG. 1, the molding element 101 comprises an anchoring part 102 intended to be fastened in a mold, extended by a molding part 103 comprising three extensions 131, 132, 133. One extension 131 is provided with an arm 104 mounted to rotate about a pivot pin 105 relative to this extension 131 so as to be able to come into contact with the ends 132', 133' of the extensions 132 and 133 to form the molding element in the molding configuration. Provision is made for the ends 130' and 133' to have beveled shapes in order to be positioned within V-shaped grooves provided on that inner face 104' of the arm 104 which is intended to be in contact with the extension 132, 133; this arrangement has the advantage of ensuring proper positioning of the pivoting arm relative to said extensions.

In this configuration which is shown corresponding to the molding configuration, the extensions and the arm mounted to pivot define two orifices 106 and 107 passing through the molding element within its depth.

In the case of a molding element of great length L, it may be difficult to demold, that is to say extract the molding element from a tread after molding, without causing severe deformation of the rubber mix surrounding the molding element. This severe deformation may result in breaking or tearing of the mix. To facilitate demolding in this case, it is advantageous to make the pivoting arm 104 in two parts, said parts, in the prolongation of one another, being mounted to be mobile relative to each other, for example at the level of the intermediate extension 132, one of the two arms always being mounted to pivot on a pivot pin fastened to an extension.

Figure 4:
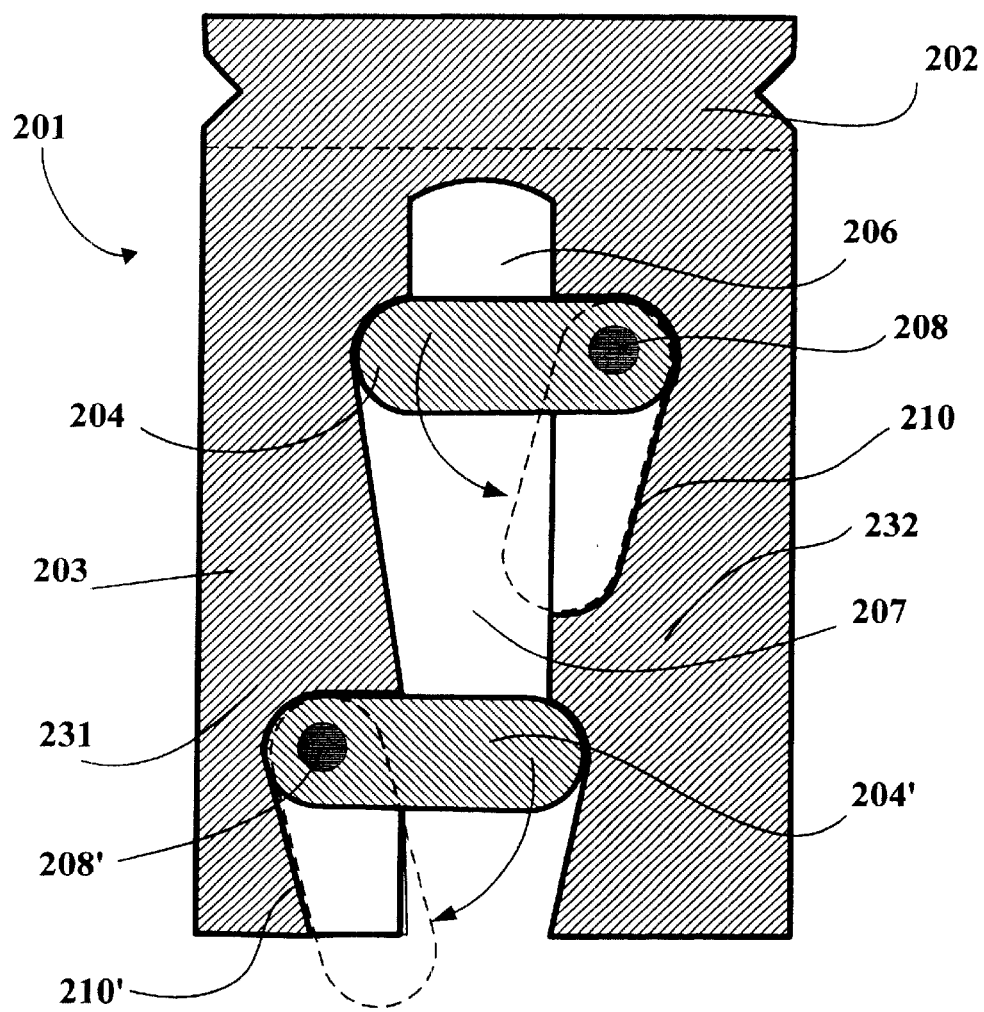
FIG. 4 shows another variant of a molding element according to the invention having two orifices in the molding position.

FIG. 4 shows another molding element 201, viewed in section in a plane perpendicular to the direction of its thickness, for molding an incision in a tire tread, this incision being provided with two connecting bridges arranged one above the other in the direction of the molding/demolding of said molding element. This molding element 201 is made in a flat metal plate of small thickness comprising an anchoring part 202 extended by a molding part 203 having two extensions 231, 232 of the same length. Each extension comprises an arm 204, 204', mounted to be mobile in rotation about a pivot pin 208, 208' passing through the molding element 201 according to its thickness. In the molding configuration shown, each arm 204, 204' bears on the other extension so as to define two orifices 206 and 207 which are intended to allow the rubber mix to pass during molding to mold two connecting bridges connecting the opposing main walls of the incision molded with said molding element. The arms 204 and 204' are mounted on the extensions 231, 232 such that, at the end of demolding, said arms come to bear on bearing surfaces 210, 210' which are inclined relative to the direction of molding/demolding to limit the rotational opening movement and thus to facilitate the repositioning of said arms in the molding configuration at the time of penetration of the molding element into the non-vulcanized mix.

Figure 5:
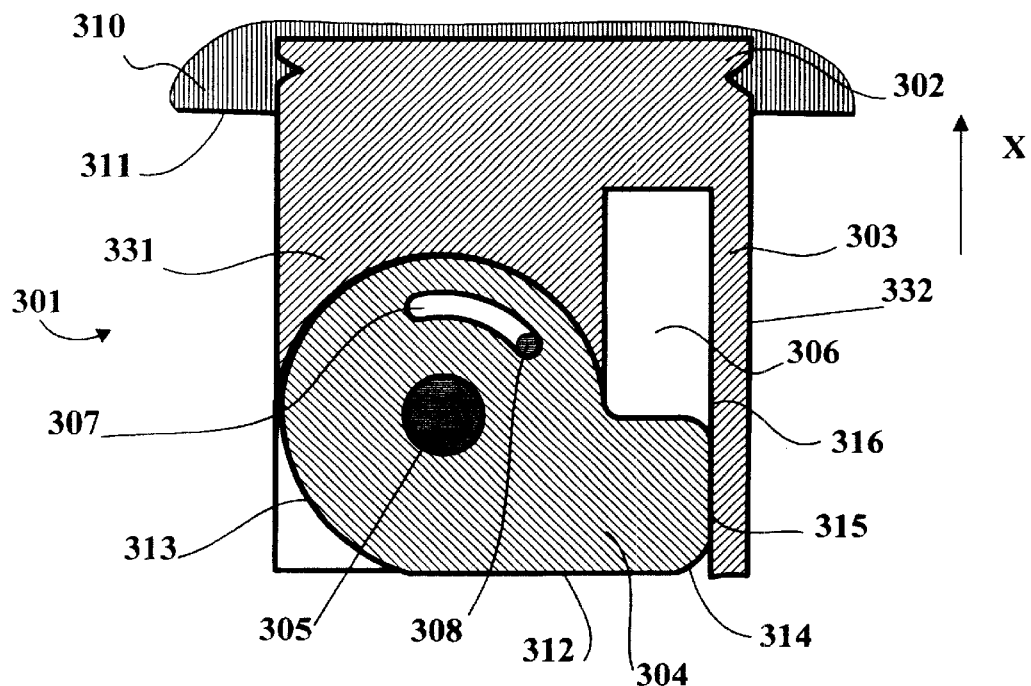
FIG. 5 shows, in section, another variant of a molding element according to the invention mounted on a mold part in the molding configuration.

FIG. 5 shows, viewed in section, another variant of a molding element 301 according to the invention mounted on a mold 310 such that the anchoring part 302 is connected to said mold and that the molding part 303 of said element projects from the molding surface 311 of said mold. The molding part 303 comprises two extensions 331 and 332 for molding a cutout, the walls of which are connected by a connecting bridge molded in the orifice 306.

The extension 331 is provided with an arm 304 mounted to rotate freely about a pivot pin 305 perpendicular to the direction of demolding/molding of the molding element (this direction is marked by the arrow X and extends in a direction perpendicular to the molding surface 311 in the present example). In the molding configuration illustrated, the arm 304 borne by the extension 331 has an end wall 315 which is partially in contact with a lateral wall 316 of the other extension 332 so as to define the orifice 306 intended for molding the connecting bridge connecting the opposing walls of the cutout molded by the molding element 301.

Furthermore, the pivoting arm 304 has a geometry suitable for facilitating demolding. For this, and viewed in the cutting plane shown, the rectilinear profile 312 of the arm 304 which is farthest from said molding surface 311 is prolonged on either side by appropriate curved profiles 313 and 314 so that, during demolding, the rotation of said arm is not prevented by the surrounding mix, reducing as far as possible the forces exerted by said arm against the mix forming the molded tread.

Figure 6:
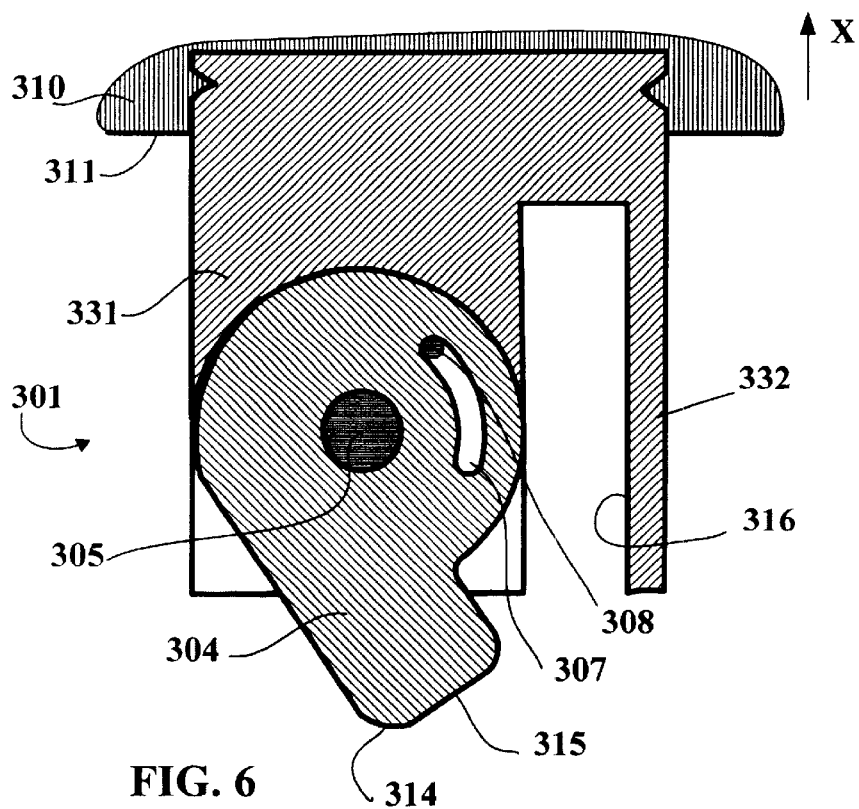
FIG. 6 shows the molding element of FIG. 5 at the end of demolding.

In FIG. 6, which shows the same molding element 301 at the end of molding, it is noted that under the action of the connecting bridge molded within the orifice 306 the pivoting arm has turned about the pin 305 to then permit complete extraction of said molding element without breaking said connecting bridge.

Means, comprising an aperture 307 made on the part of the pivoting arm 304 mounted on the extension 331 and a spindle 308 fastened within said extension 331 and accommodated within the aperture 307, are provided for limiting the rotational movement during the extraction of the molding element 301 so as then to facilitate the closing of the molding element under the action of the mix during the introduction of said molding element into a new tread to be molded (to regain the molding configuration of FIG. 5).

Figure 7:
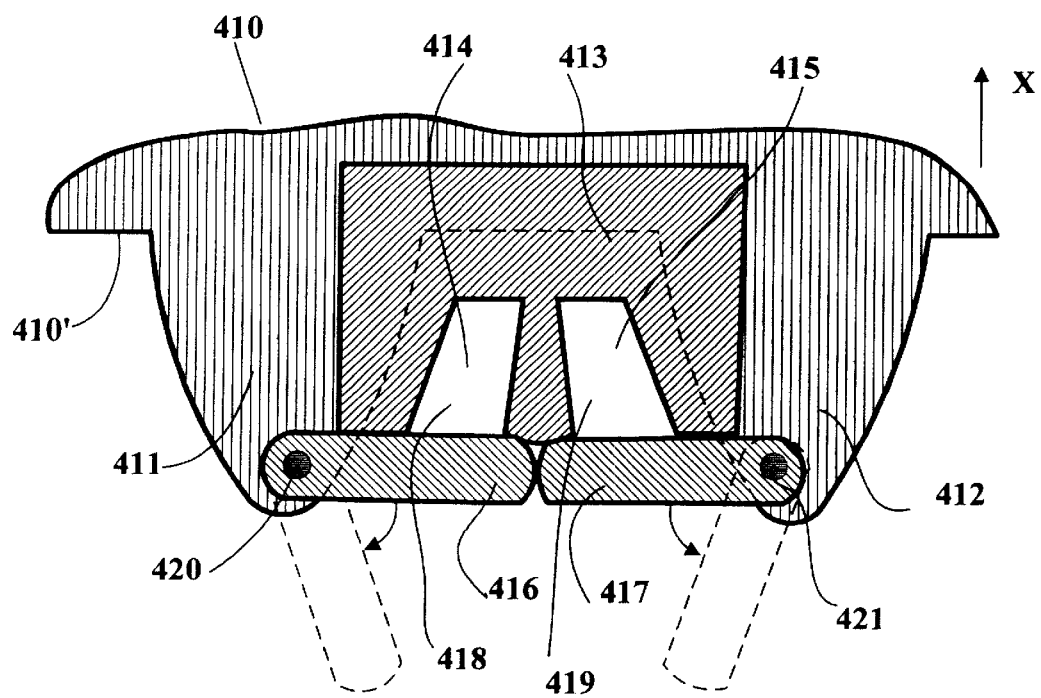
FIG. 7 shows a section through another mold part according to the invention.

FIG. 7 shows a section through a mold part 410 having a molding surface 410' and provided with two ribs 411 and 412 forming two elements in relief extending substantially in the same direction for molding two grooves in a tread. On this same mold part, a thin blade 413 forming a third element in relief is anchored both in the mold part and in the ribs 411, 412 at its two lateral ends; this blade 413 extends in a transverse direction to the direction of the ribs 411, 412. This blade 413 is fastened to the mold part and to the ribs, in the example illustrated, at the time of the production of said part by casting.

This blade 413 has two main planar faces (only the front face is visible in FIG. 7) for molding the main walls of an incision, said faces being limited by an end face, the geometry of which, which can be seen in section in FIG. 7, defines two notches 414 and 415 to allow the mixture to pass during the molding of a tread.

On each rib 411, 412, an arm in the form of a blade 416, 417 is mounted to pivot about a pivot pin 420, 421, said blades, in the example described, having the same thickness as the blade 413 anchored in the mold part 410. Each pivoting blade 416, 417 is mounted within a suitable housing provided on each of the ribs. These two pivoting blades 416, 417, which are mounted on the ribs 411, 412 and are shown in solid lines in the molding configuration, have their end walls partially bearing against the end wall of the blade 413 so as to form a molding element for molding a single incision, the main walls of which are connected by bridges molded in the two orifices 418, 419 defined by the fixed blade 413 and the pivoting blades 416, 417.

After molding and under the action of the rubber bridges molded in the orifices, the pivoting blades will turn about their respective pivot pins, as shown in broken lines in the same figure, to permit demolding without breaking the molded connecting bridges. The mold part described makes it possible to mold an incision which opens laterally into grooves, and the main walls of which are connected by two connecting bridges while maintaining continuity of the volume of the incision.

Of course, the mold according to the invention can be readily adapted to mold, for example, an incision which is located entirely beneath the running surface of the tread when new (that is to say which does not open on to this surface); in this case, the pivoting arm or arms are entirely located at a distance greater than zero from the molding surface of said mold and come to bear one on the other.

We claim:

1. A molding element intended to be anchored in a part of a tread mold for molding a rubber tread, the molding element molding a cutout in the tread having its main walls connected by at least one connecting bridge of rubber mix, this molding element including an anchoring portion and a molding portion, the anchoring portion being anchored in the tread mold with the mold portion extending from the molding face of the tread mold, the molding element comprising at least two extensions having opposite faces which mold the walls of the cutout, at least one of these extensions comprising at least one arm which is pivotally mounted to said extension, the molding element being characterized in that, in the molding position, the arm pivotally mounted on one extension bears on at least another extension of the same molding element to define at least one orifice passing through the molding element for molding a connecting bridge.

2. A molding element according to claim 1 wherein means are provided for limiting the maximum angle of rotation of the pivotal arm during demolding so as to facilitate the return into the molding position upon penetration of said molding element into a strip of rubber mix which has not yet been vulcanized.

3. A molding element according to claim 1 wherein elastic return means are provided for turning the pivotal arm in order to regain the molding position after demolding.

4. A molding element according to claim 1 further comprising retaining means for keeping the pivotal arm in the molding position, said means being effective up to a given level of stress.

5. A part of a tire tread mold comprising at least one molding element according to claim 1.

6. A part of a tire tread mold, having a molding face and being displaceable in molding/demolding directions, the tire tread mold part comprising at least two elements in relief projecting from the molding face, at least one of said elements in relief bearing at least one arm mounted to pivot about a pivot pin attached to said element in relief, the tire tread mold part comprising in the molding configuration said at least one arm bearing on another element in relief to form at least one orifice for rubber mix to pass through during the molding of a tread.

7. A part of a tire tread mold according to claim 6 wherein said element in relief having said pivotal arm cooperates with said another element in relief to mold a cutout, the main walls of which are connected by at least one connecting bridge of rubber mix, the pivotal arm being located at a distance greater than zero from the molding face of the tire tread mold part.

8. A part of a tire tread mold according to claim 6 further comprising elastic return means for pivoting each pivotal arm to resume its position in the molding configuration for each new molding operation for a tread.

* * * * *